United States Patent [19]

Naaktgeboren

[11] Patent Number: 4,930,411
[45] Date of Patent: Jun. 5, 1990

[54] APPARATUS FOR DENSITY CONTROL IN RECTANGULAR BALERS TO IMPROVE THE BALE TYING OPERATION

[75] Inventor: Adrianus Naaktgeboren, Zedelgem, Belgium

[73] Assignee: Ford New Holland, Inc., New Holland, Pa.

[21] Appl. No.: 338,170

[22] Filed: Apr. 14, 1989

[51] Int. Cl.$^5$ .................... B65B 57/10; B30B 15/26
[52] U.S. Cl. .......................... 100/4; 100/43; 100/50; 100/99; 100/191
[58] Field of Search .............. 100/4, 43, 50, 48, 179, 100/189, 191, 99; 56/341, 343; 289/1.5, 2, 18.1

[56] References Cited

U.S. PATENT DOCUMENTS

| | | | |
|---|---|---|---|
| 3,862,592 | 1/1975 | Freeman | 100/4 |
| 4,493,498 | 1/1985 | Vansteelant | 289/2 |
| 4,624,180 | 11/1986 | Strosser | 100/43 X |
| 4,627,341 | 12/1986 | Sudbrack et al. | 100/43 X |
| 4,729,301 | 3/1988 | Smith et al. | 100/43 |
| 4,753,463 | 6/1988 | Strosser | 100/43 X |
| 4,753,464 | 6/1988 | Jackson | 289/2 |

Primary Examiner—Harvey C. Hornsby
Assistant Examiner—Stephen F. Gerrity
Attorney, Agent, or Firm—Griffin, Branigan & Butler

[57] ABSTRACT

A rectangular baler has a density control for controlling the density to which crop material is compacted in a bale case by a cyclically operating plunger, and a cyclically operating tying mechanism for typing loops of binding material around successive lengths of the compacted crop material to form bales. In order for the tying mechanism to function properly the binding material must slide between a tied bale and the crop material being compacted against the tied bale. If the sliding friction is too great, the binding material breaks or is pulled free of the tying mechanism thus resulting in failure of the tying process. To reduce the sliding friction, the density to which the crop material is compacted is reduced for an interval of time following each cycle of the tying mechanism. The interval of time is controlled by the rate at which crop material enters the bale case following a cycle of the tying mechanism.

8 Claims, 3 Drawing Sheets

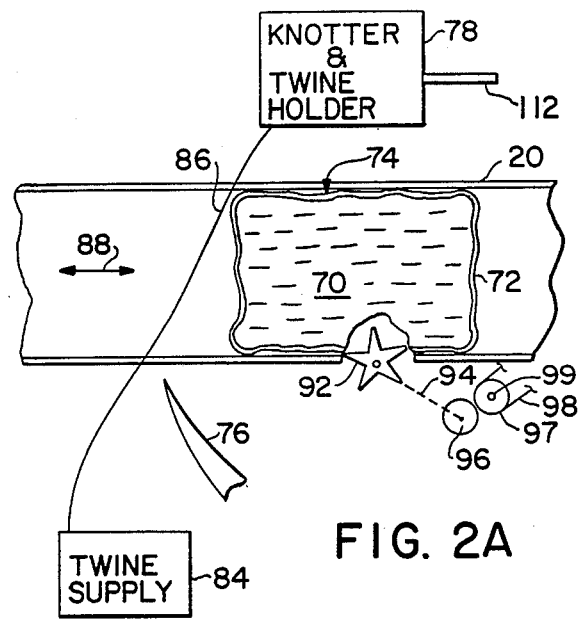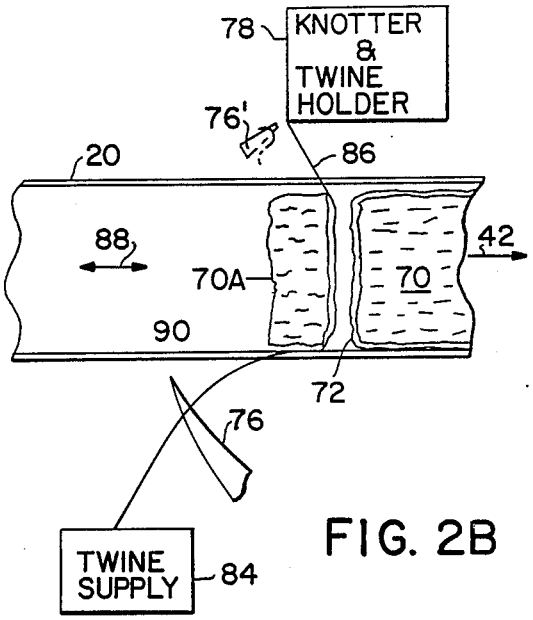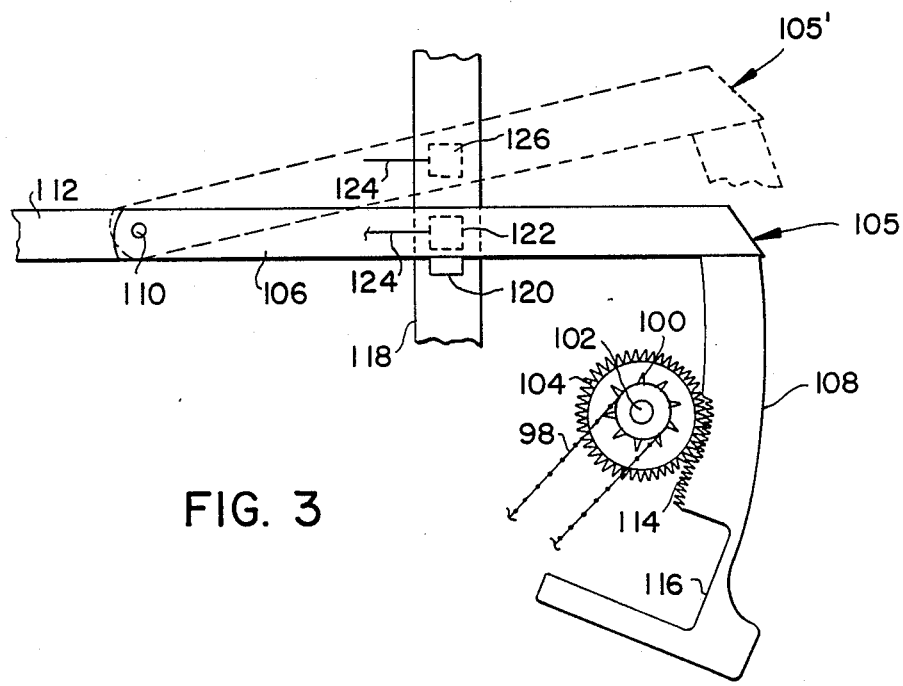

APPARATUS FOR DENSITY CONTROL IN RECTANGULAR BALERS TO IMPROVE THE BALE TYING OPERATION

FIELD OF THE INVENTION

The present invention relates to rectangular balers for picking up a crop material from a field, compacting it into rectangular bales, and tying the bales with twine. The invention comprises an improvement in rectangular balers of the type disclosed in Strosser U.S. Pat. Nos. 4,624,180 and 4,753,463, the disclosures of which are incorporated herein by reference. This application is related to copending application Ser. No. 07/338,175.

BACKGROUND OF THE INVENTION

In conventional rectangular balers, crop material is picked up from the ground by a pick-up unit and fed into an elongated bale case or chamber. The crop material is fed into the bale case in timed sequence with a reciprocating plunger. The plunger compresses the crop material, gradually forming a bale and advancing it toward a exit opening in the bale case. When the bale being formed reaches a desired length, a tying mechanism is actuated to wrap at least one loop of binding material around the bale, tie a knot in the binding material, and cut the tied loop from the supply of binding material. This tying operation leaves an end portion of the binding material from the supply so that it extends across the bale case. After the tying operation, the formation of a new bale begins and as the new bale is formed it forces the tied bale and a portion of the binding material toward the exit opening in the bale case, the binding material sliding between the tied bale and the new bale being formed as both are forced to move toward the exit opening.

As disclosed in Pat. No. 4,624,180, a baler of the type described above may have its operations automatically controlled by a microprocessor. In addition, an operator may input information into a control panel so that the baler automatically forms bales compacted to a desired density.

When baling damp silage crop at a desired density, the tying process may intermittently fail. Failure occurs either because of breakage of the binding material or because the binding material is pulled from the tying mechanism. Both types of failure usually occur within a few plunger strokes after a cycle of the tying mechanism. It is during this interval that the binding material encounters the greatest resistance to sliding between the tied bale and the new bale being formed as both are pushed toward the exit opening in the bale case. Copending application Ser. No. 07/338,175 discloses a method whereby failures of the tying process can be substantially reduced by operating the density control mechanism so that for the first few strokes of the plunger after each bale is tied, the incoming crop material is compacted to a lower density.

The method disclosed in the copending application substantially reduces the number of failures of the tying process. However, when working a very light windrow, or when a cycle of the tying mechanism takes place near the end of a windrow as the baler enters the headlands, failure of the tying process may still occur. The reason is that during several plunger strokes following a cycle of the tying mechanism little crop material enters the bale case. Thus, after the several plunger strokes, when the density control returns to the higher (normal) density, conditions in the baler are almost the same as immediately after a cycle of the tying mechanism. When crop material is then compacted at the higher density, the binding material may still break.

SUMMARY OF THE INVENTION

An object of the present invention is to provide a novel apparatus for reducing the frequency of failure of the bale tying process in a rectangular baler.

An object of the present invention is to improve the reliability of the bale tying mechanism in a rectangular baler which normally compacts crop material to a first, desired density by controlling the baler to compact the crop material to a second, lower density during formation of the first part of each bale.

An object of the invention is to provide a microprocessor controlled rectangular baler including a plunger reciprocating in a bale case to compact increments of crop material, and length sensing means for determining when a predetermined length of compacted crop material has been formed, the microprocessor being responsive to the length sensing means for controlling the compaction of the crop material at a first, lower density when the length of compacted crop material is less than the predetermined length and thereafter controlling compaction of the crop material at a second, higher density.

An object of the invention is to provide a rectangular baler having a microprocessor based control system for controlling operation of the baler, bale length sensing means for producing a first signal indicating the start of formation of a bale of crop material and a second signal when the bale of crop material has reached a predetermined length and means connecting the sensing means to the microprocessor based control system, the control system being responsive to the second signal for controlling the baler to compact the crop material to a desired density and responsive to the first signal for controlling the baler to compact the crop material to a second density which is less than the first density.

Other objects of the invention and its mode of operation will become apparent upon consideration of the following description and the accompanying drawings.

BRIEF DESCRIPTION OF THE DRAWINGS

FIGS. 2A and 2B are schematic views illustrating the problem solved by the present invention;

FIG. 3 illustrates a portion of a bale length sensing means having a first sensor for sensing when formation of a new bale begins and a second sensor for sensing when the bale being formed has reached a predetermined length;

DETAILED DESCRIPTION OF THE INVENTION

Figure 1:
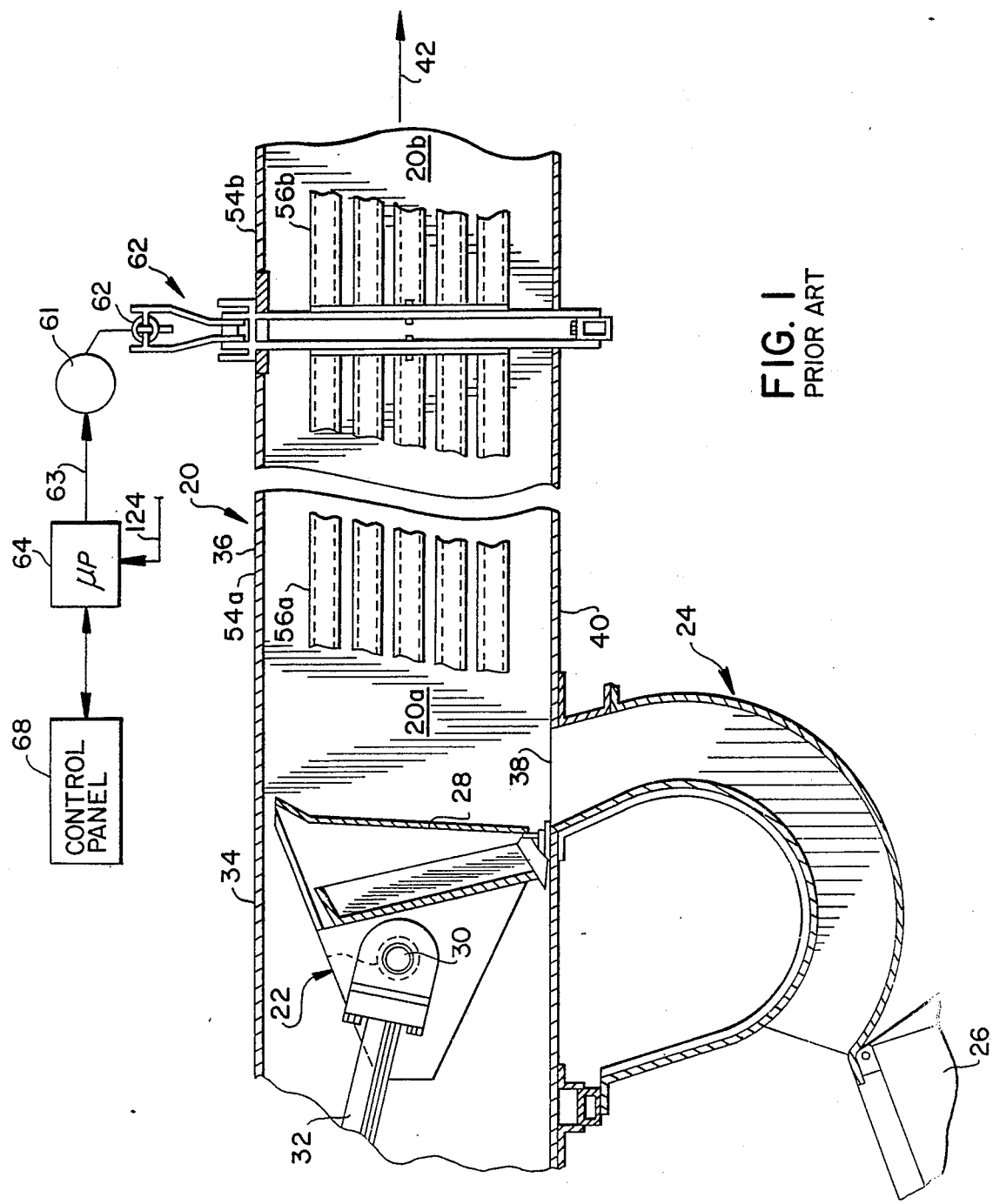
FIG. 1 schematically illustrates a bale density control system and shows a side elevation, partly in section, of the bale case and plunger in a rectangular baler.

FIG. 1 illustrates a portion of a rectangular baler of known design, including a bale case 20, a plunger assembly 22, a feed chamber 24 and a pick-up mechanism 26. The plunger assembly includes a plunger element 28 connected by wrist pins 30 to a pair of connecting rods 32. As the connecting rods 32 are driven by a drive source (not shown) the plunger 28 cyclically moves back and forth in a first portion 34 of the bale case. A second portion 36 of the bale case includes movable top rails 54a, 54b and side rails 56a, 56b. A tension adjusting mechanism 60 is provided for moving the rails 54a, 54b, 56a, and 56b to thereby vary the cross-sectional area of regions 20a and 20b of the bale case. The tension adjusting mechanism 60 includes a hydraulic cylinder unit 62 for moving the movable rails and a current controlled pressure valve 61 for controlling the hydraulic cylinder unit 62. A microprocessor based control circuit 64 controls the operation of the baler and provides a pulse width modulated signal over lead 63 to control valve 61. An operator's control and indicator panel 68 is provided so that an operator may manually key in control data and observe indications of operating conditions in various parts of the baler.

The system shown in FIG. 1 is fully described in U.S. Pat. No. 4,624,180. Briefly, an operator selects a desired density depending on the crop to be harvested, its moisture content, etc. The selected density value is keyed into the system at the control and indicator panel 68. The microprocessor 64 stores the desired density value and cyclically compares it with a value representing the actual density to which crop material entering the bale case 20 is being compacted. This value is derived by sensing the load placed on connecting rods 32 in driving crop material through bale case 20. From the value representing actual density and the input representing desired density, the microprocessor 64 derives a pulse width modulated signal to control the valve 61 thereby adjusting the positions of rails 54a, 54b, 56a, and 56b. This changes the cross-sectional areas of the regions 20a and 20b of the bale case 20, thereby changing the force which plunger 28 must exert on the crop material to force it through the bale case. Thus, the density to which crop material is compacted is controlled by microprocessor 64 as it controls the rails.

As the baler moves over the ground, crop material is picked up by pick-up mechanism 26 and fed through feed chamber 24 so that it enters the bale case through an opening 38 in the bottom wall 40 of the bale case. The plunger 28 cyclically moves back and forth in the bale case 20 and each time it moves to the right it compacts crop material which has entered the bale case through opening 38 against already-compacted crop material. As more crop material is compacted it is forced in the direction of arrow 42 toward an exit opening (not shown) at the rear end of the bale case.

Before the crop material exits from bale case 20 it is, in effect, separated into bales by a bale tying mechanism of conventional design. The bale tying mechanism is not shown in FIG. 1 but its purpose is to wrap loops of a binding material such as twine or wire around successive lengths of crop material in the bale case, tie knots in the loops, and cut the tied loops from the binding material supply. FIG. 2A schematically illustrates a bale 70, located in bale case 20, and surrounded by a loop of binding material (twine) 72 in which a knot 74 has been tied. The loop 72 and knot 74 have been formed by a tying mechanism including a needle 76 located below the bale case and a knotter and holder, collectively designated 78, located above the bale case. The bale tying mechanism may, for example, be of the type described in U.S. Pat. No. 4,493,498 having a plurality of needles, knotters and holders arrayed transverse to the length of the bale case.

FIG. 2A shows the position of a twine at the end of a cycle of the tying mechanism. Twine from a twine supply 84 extends through the end of needle 76 and an end portion 86 of the twine extends through the bale case and is held by the holder 78. The end portion 86 has been severed from the knot 74. Referring now to FIG. 2B, as more crop material enters bale case 20 and is compacted by reciprocating the plunger as indicated by arrow 88, the compacted crop material begins forming a new bale 70A. As bale 70A is formed, both it and bale 70 are pushed in the direction of arrow 42 toward the exit opening of the bale case. This movement of bale 70A draws twine from twine supply 84. At the same time, and because the upper end of the twine is held by twine holder 78, the twine slides upwardly between bale 70 and partially formed bale 70A if the crop material is not being compacted so tightly that it prevents the twine from sliding. If the sliding friction should be too great then the twine will not slide but will break or its end will pull loose from the twine holder 78 and the tying process will fail.

Assuming normal operation, after a desired length of crop material has been compacted into bale 70A, the tying mechanism is actuated. The needle 76 swings arcuately upwardly through the bale case and delivers a portion 90 of the twine to knotter and twine holder 78 as indicated at 76'. The needle 76 returns to its initial position while the knotter and twine holder tie a knot with the twine portions 86 and 90, sever the twine at portion 90, and leave a new twine portion 86 held by holder 78.

As described above with respect to FIG. 2B, the twine portion 86 may break or pull free of twine holder 78 if the crop material in partially formed bale 70A is too densely compacted against bale 70. The failure usually occurs within three to five plunger strokes after the tying mechanism has completed its cycle of operation but may occur later when a light windrow is being worked or if the baler enters the headlands immediately after a cycle of the tying mechanism. It is believed that after a sufficient length of bale has been formed, the twine forms a groove across the face of the compacted crop material 70A so that the sliding friction is reduced. Therefore, by compacting the crop material 70A at some density lower than the normal i.e. programmed, compaction density until after a sufficient length of crop material 70A has been compacted, the frequency of failure of the bale tying process may be reduced. When subsequently the controller 64 sets the density level back to the "normal" value, the density in the initial portion of the bale 70A is increased accordingly without however hampering the continued sliding movement of the twine through the groove during the remainder of the bale forming cycle.

The bale length may be measured by a bale length measuring apparatus similar to that disclosed in U.S. Pat. No. 4,493,498. In FIG. 2A, the bale length measuring apparatus includes a star-shaped metering wheel 92 mounted underneath bale case 20 but extending upwardly into the bale case through a slot. The metering wheel is fixedly mounted on a rotatable shaft 94 that extends transversely to the direction of bale movement. A gear 96 is mounted on shaft 94 at a point which is outboard of the bale case. Gear 96 meshes with one of a pair of gears 97 mounted on a shaft 99. The other gear 97 drives a chain 98 which extends upwardly along one side of bale case 20 to a further gear 100 (FIG. 3) mounted on a shaft 102 which is supported above bale case 20 and extends transversely to the direction of bale movement.

Fixedly mounted on shaft 102 is a further gear 104 for driving a tying mechanism trip arm. The trip arm assembly 105 comprises a generally horizontally extending lever 106 attached to a curved segment 108 which extends downwardly. Lever 106 is attached by a pivot 110 to a further lever 112.

One edge 114 of curved segment 108 has teeth which mesh with the teeth of gear 104. In addition, curved segment 108 is provided with a recess 116. A fixed support 118 supports an adjustable stop schematically illustrated at 120. The stop limits the downward pivoting of lever 106 about pivot 110. A tension spring (not shown) acts through lever 112 and pivot 110 to bias lever 106 and segment 108 so that the toothed surface 114 of segment 108 engages gear 104.

Immediately after the bale tying mechanism has completed a cycle to tie a bale, the trip arm assembly 105 is in the position shown in FIG. 3. As more crop material enters the bale case 20 and formation of a new bale begins, the compacted crop material is forced to the right as viewed in FIG. 2A. The metering wheel 92 is engaged by, and driven by the compacted crop material to thereby drive the train including shaft 94, gear 96, gears 97, chain 98, gear 100, shaft 102 and gear 104. The gear 104 is rotated counter-clockwise as viewed in FIG. 3 so, as it rotates, the teeth on the gear drive the trip arm assembly 105 upwardly, the trip arm assembly pivoting about pivot 110. When the gear 104 rides off the lower end of toothed portion 114, the tension of the previously mentioned spring (not shown) pulls lever 112 and trip arm assembly 105 to the left as viewed in FIG. 3. As disclosed in U.S. Pat. No. 4,493,498, the lever 112 actuates a single revolution clutch which couples drive power to the tying mechanism including twine needle 76 and the knotter 78. The tying mechanism then goes through a cycle to tie loops of twine around the compacted crop material. During this cycle, a cam (not shown) which is also driven by the clutch, applies a force to lever 112 to move the lever and trip arm assembly 105 to the right as viewed in FIG. 3. This frees the recessed portion 116 of the trip arm assembly from gear 104. The trip arm assembly falls downwardly, pivoting about pivot 110, until it again engages the stop 120.

A Hall-effect sensor or switch 122 is mounted on the support 118 and produces an electrical output signal on a lead 124. This lead is connected to the microprocessor-based control system 64 (FIG. 1) to signal the control system that a cycle of the bale tying mechanism has been initiated and the trip arm assembly 105 has returned to its home position. A magnet (not shown) mounted on the trip arm assembly actuates the switch so that it produces a signal having a first level as long as the magnet is in proximity to the switch, and a second level when the magnet is displaced from the switch. With reference to FIG. 3, the switch 122 produces a signal having the first level from the time the trip arm assembly 105 drops to the position shown in solid outline and continues producing the first level signal until after a predetermined length of compacted material has moved past metering wheel 92 to thereby raise the trip arm assembly 105 to the position illustrated at 105'. The switch then produces an electrical output signal of a second level and continues to do so until after the next cycle of the bale tying mechanism when the trip arm assembly returns to the position shown in solid lines in FIG. 3. The first level output signal from sensor 122 sets a KNOTTER CYCLE flag at a first memory location in the microprocessor-based control system 64 and the second level output signal from sensor 126 clears an SPC CYCLE flag at a second memory location.

As previously described, an operator may key into control panel 68 a value representing the density to which it is described to normally compact the crop material. The microprocessor-based control system 64 senses conditions in the baler and from the conditions sensed and the density value keyed into the control panel 68 the system computes a value which is stored at a memory location designated PWM. A new value of PWM is computed for each stroke of plunger 28. Each PWM value computed controls the duration of the signal applied to valve 61 to adjust the rails of the bale case and thereby cause the crop material to be compacted to the density initially entered at the control panel.

In accordance with the present invention the operator's control and indicator panel 68 is modified to accept a further input parameter which represents the percentage by which the operator wishes to decrease the normal desired density during the early part of the formation of each bale. The percentage value is selected by the operator depending upon such conditions as the type of crop being harvested and its moisture content. The percentage value entered at the control panel is stored by the microprocessor in a memory location designated % DECREASE.

Figure 4:
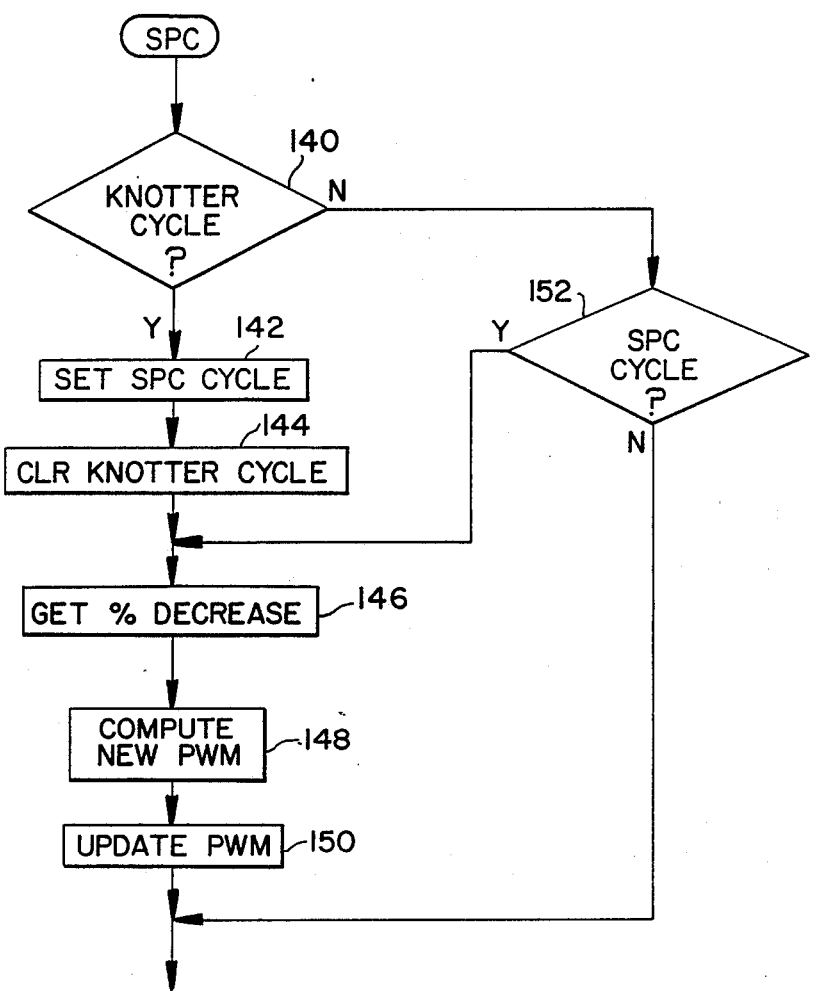
FIG. 4 is a flow diagram illustrating a routine suitable for use in a microprocessor controlled rectangular baler to control the baler in accordance with the present invention.

It is also necessary to modify the program controlling the microprocessor based control system of the Strosser patent by adding an SPC Silage Pressure control routine as shown in FIG. 4. This routine may be inserted in the LOOP routine described in the patent, preferably at a point after the value PWM is computed and stored.

Each stroke of plunger 28 initiates execution of the LOOP routine as described in the Strosser patent and during each execution of the LOOP routine the SPC routine shown in FIG. 4 is executed. The SPC routine begins at step 140 by testing the KNOTTER CYCLE flag. This flag is an indicator bit stored in a specific memory location each time the sensor 122 sends a first level signal to the microprocessor-based control system 64 indicating that the bale tying mechanism has just cycled.

Assuming that the bale tying mechanism has just cycled, the test at step 140 proves true and the program proceeds to step 142 where it sets an SPC CYCLE flag. This flag is an indicator bit stored in a specific location. It is set at step 142 during the first execution of the SPC routine following a cycle of the bale tying mechanism. It is reset when the sensor 122 sends a second level signal to the microprocessor-based control system 64 indicating that some predetermined incremental first part of a bale has been formed. Therefore, anytime the SPC routine is executed an the SPC cycle flag is set, it means that the desired density control value PWM should be recomputed.

At step 144 the program clears the KNOTTER CYCLE flag. At step 146 it reads % DECREASE from memory and at step 148 it multiples PWM by % DECREASE to obtain a value which is then stored at location PWM by step 150. Thus, the value of PWM computed prior to execution of the SPC routine, and representing the desired density as entered at the control panel 68 by the operator, is replaced with a smaller value PWM. When this smaller value is subsequently converted to a pulse width modulated signal for controlling valve 61, the rails of the bale case 20 are adjusted so that the crop material is compacted to a lower density.

On the second execution of the SPC routine, the test at step 140 proves false and the program branches to step 152 where the SPC CYCLE flag is tested. Since it was set at step 142 during the first execution of the SPC routine, the test proves true and the program branches to step 146. Steps 146, 148 and 150 are then executed as previously described so that a modified PWM value is compacted and used to control the density.

The next time the SPC routine is executed the routine advances through steps 140, 152, 146, 148 and 150 as described above. This sequence is repeated for each stroke of plunger 28 until such time as the length of crop material compacted is sufficient to cause trip arm assembly 105 to be raised so that the sensor 122 produces an output signal having a second level which clears the SPC CYCLE FLAG. Then, on the next execution of the SPC routine the program proceeds from step 140 to step 152. At step 152 the test now proves false so the program bypasses steps 146, 148, and 150. Therefore, once sensor 122 produces the second level output signal, the value of PWM computed from the desired density value keyed into control panel 68 by the operator is used to derive the pulse width modulated signal for controlling valve 61.

After the SPC CYCLE flag is cleared, each plunger stroke causes another execution of the SPC routine during which only steps 140 and 152 are executed. This continues until, after a full bale has been compacted and a cycle of the tying mechanism has taken place, the trip arm assembly 105 returns to the position shown in FIG. 3 and the sensor 122 produces the first level output signal.

While a preferred embodiment of the invention has been described in specific detail, it will be understood that various modifications and substitutions may be made in the described embodiment without departing from the spirit and scope of the invention as defined in the appended claims. For example, it is not necessary to provide for entering the value % DECREASE at the operator panel. The microprocessor may be programmed to use an internally stored percentage value although such an arrangement would not permit variations based on crop moisture or the type of crop being harvested. Other modifications will be readily apparent to persons of ordinary skill in the art.

The embodiments of the invention in which an exclusive property or privilege is claimed are defined as follows.

1. A rectangular baler comprising:
    compaction means for compacting a crop material fed into said baler;
    a cyclically operable bale tying mechanism for tying a binding material around successive increments of said compacted material to form bales;
    bale length measuring means for producing a first output signal after each cycle of said bale tying mechanism and a second output signal when said compaction means has compacted crop material of a predetermined length after each cycle of said bale tying mechanism; and,
    control means responsive to said first and second output signals for controlling said compaction means to compact said crop material to a first density during the interval between each second output signal and the next occurring first output signal and controlling said compaction means to compact said crop material to a second density, less than said first density, for the interval between each first output signal and the next occurring second output signal.

2. A rectangular baler as claimed in claim 1 wherein said bale length measuring means includes a trip arm for initiating a cycle of said bale tying mechanism and a metering means driven by compacted crop material for moving said trip arm.

3. A rectangular baler as claimed in claim 2 and further comprising sensor means for sensing positions of said trip arm and producing said first and second output signals.

4. A rectangular baler as claimed in claim 1 wherein said control means includes an operator panel whereby an operator may enter into the control means a value representing said first density.

5. A rectangular baler as claimed in claim 1 wherein said control means includes an operator panel whereby an operator may enter into the control means values for determining the first and second densities to which said crop material is to be compacted.

6. A rectangular baler as claimed in claim 5 wherein said control means includes a microprocessor responsive to said first and second output signals and said values entered at said operator panel for controlling the density to which said crop material is compacted.

7. A rectangular baler of the type having a microprocessor based control system responsive to a first density value entered into said control system through an operator panel for controlling the compaction of crop material to a desired density and length measuring means for producing a first signal when a cycle of operation of a bale tying mechanism takes place to tie a binding material around a bale of compacted crop material, said rectangular baler being characterized in that:
    means are provided responsive to said bale length measuring means for producing a second signal each time a predetermined length of crop material has been compacted after each cycle of operation of said bale tying mechanism; and,
    said microprocessor-based control system includes means responsive to each said first signal for controlling the compacting of said crop material to a density less than said desired density until occurrence of the next second signal, and means responsive to each said second signal for controlling the compaction of said crop material to said desired density until occurrence of the next first signal.

8. A rectangular baler of the type having a microprocessor based control system responsive to a first density value entered into said control system through an operator panel for controlling the compaction of crop material to a desired density and length measuring means for producing a first signal when a cycle of operation of a bale tying mechanism takes place to tie a binding material around a bale of compacted crop material, said rectangular baler being characterized in that:
    said bale length measuring means produces said first signal until a predetermined length of crop material has been compacted after each cycle of operation of said bale tying mechanism after which it produces a second signal; and,
    said microprocessor-based control system includes means responsive to each said first signal for controlling the compacting of said crop material to a density less than said desired density until occurrence of the next second signal, and means responsive to each said second signal for controlling the compaction of said crop material to said desired density until occurrence of the next first signal.

* * * * *